United States Patent [19]

Saia

[11] 4,236,342

[45] Dec. 2, 1980

[54] COMBINED FISH LURE, BAIT HOLDER AND ARTIFICIAL BAIT

[75] Inventor: Carman R. Saia, Bellingham, Wash.

[73] Assignee: Kasabell Industries, Bellingham, Wash.

[21] Appl. No.: 12,649

[22] Filed: Feb. 16, 1979

[51] Int. Cl.³ .................. A01K 85/00; A01K 85/01
[52] U.S. Cl. .................................... 43/17.6; 43/42.29
[58] Field of Search ............... 43/17.6, 42.22, 42.24, 43/42.28, 42.29, 42.32, 42.34, 44.6

[56] References Cited

U.S. PATENT DOCUMENTS

| 1,264,626 | 4/1918 | Foss | 43/42.29 |
|---|---|---|---|
| 1,473,420 | 11/1923 | Doering | 43/42.32 |
| 2,124,152 | 7/1938 | Salm | 43/42.32 |
| 3,040,467 | 6/1962 | Norton | 43/42.29 X |
| 3,122,853 | 3/1964 | Koonz | 43/42.24 |
| 3,724,117 | 4/1973 | Flanagan | 43/42.24 |
| 3,940,869 | 3/1976 | Roberts | 43/42.24 X |

FOREIGN PATENT DOCUMENTS 555512  4/1958  Canada ................................ 43/44.6

*Primary Examiner*—Nicholas P. Godici
*Attorney, Agent, or Firm*—Seed, Berry, Vernon & Baynham

[57] ABSTRACT

An artificial bait for use with a novel combined fish lure and bait holder is disclosed. The bait holder is formed of a strip of resilient spring-like material folded intermediate its length to provide two laterally spaced side legs adapted to clamp and hold the a bait inserted therebetween. A flat plate having two slots therein at one end receives the respective laterally spaced side legs of the bait holder therethrough. As the plate is moved along the length of the side legs from the fold thereof the side legs are moved toward each other to clamp and hold the bait. The combined lure, bait holder and bait rotates as it is pulled through the water. A length of fish line extends through an opening along the mid-line of the plate. The fish line has a fastening end for attaching to a fishline and a hook end provided with hook means. An artificial bait which may be used with a combined fish lure and a bait holder is a thin piece of synthetic foam having an irridescent, artificial, simulated scale-like material secured to the planar sides of the foam material to simulate a fish.

7 Claims, 6 Drawing Figures

U.S. Patent     Dec. 2, 1980     4,236,342
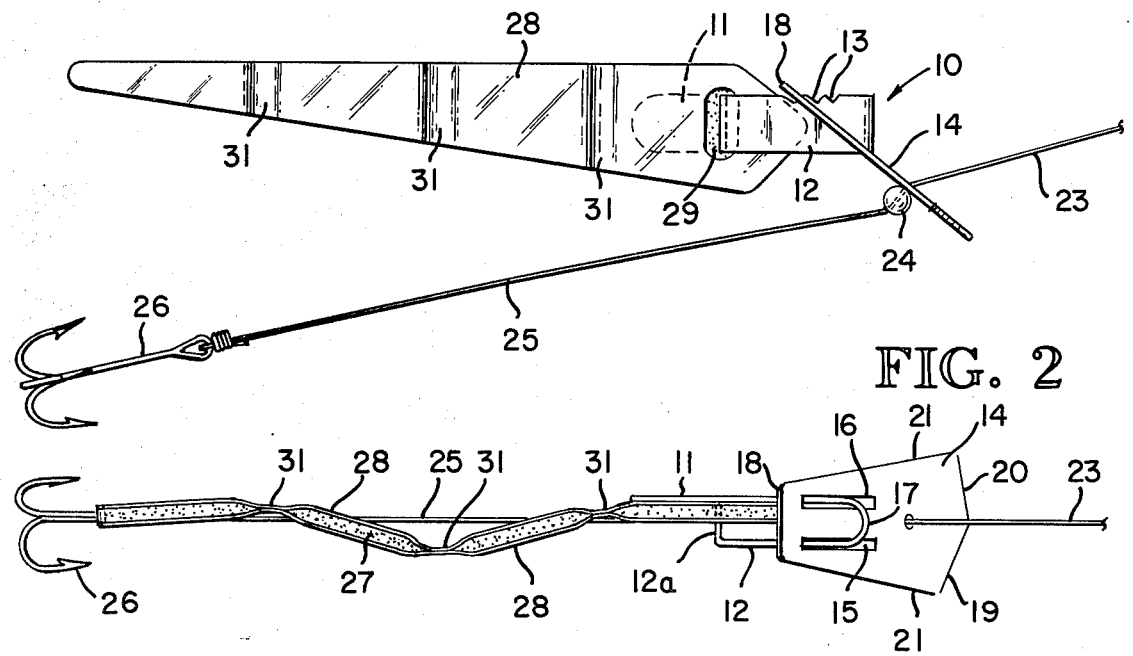
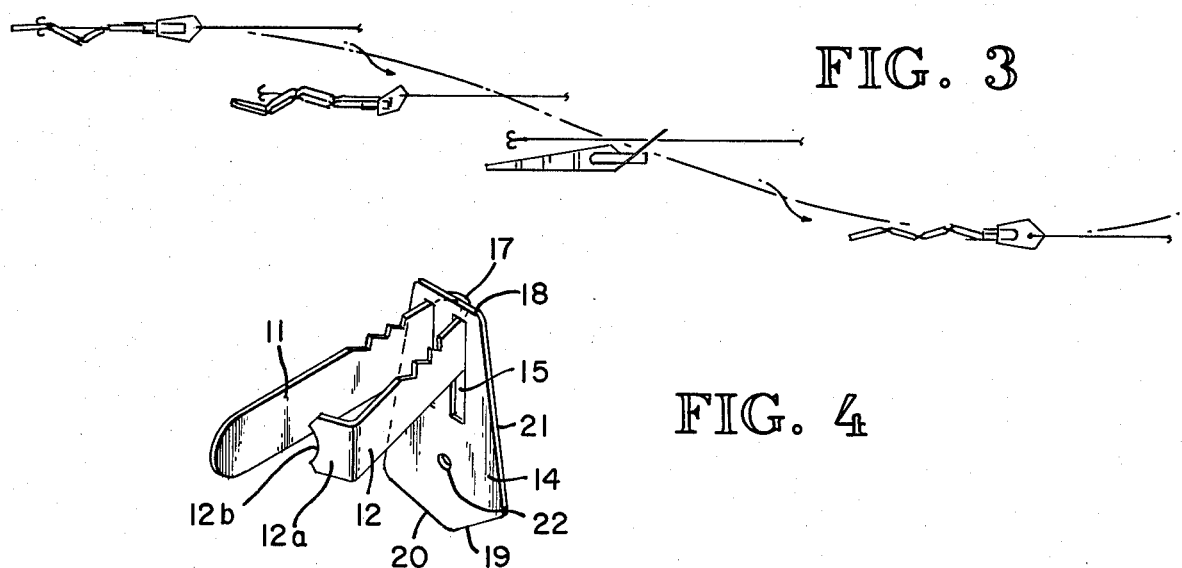
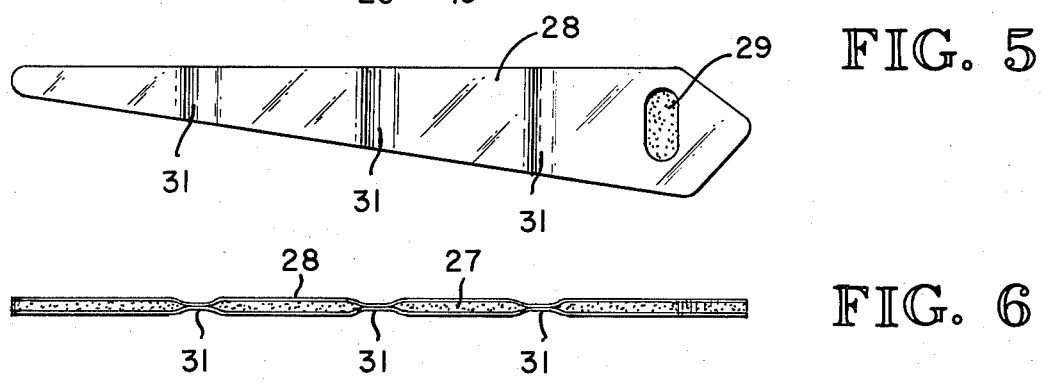

4,236,342

COMBINED FISH LURE, BAIT HOLDER AND ARTIFICIAL BAIT

BACKGROUND OF THE INVENTION

1. Field of the Invention

This invention relates to a combined fish lure and bait holder and to an artificial bait for use with the combined fish lure and bait holder as well as to the combined fish lure/bait holder/artificial bait assembly.

2. Prior Art Relating to the Disclosure

Fish lures capable of clamping a herring strip or other fish bait are known. U.S. Pat. No. 2,780,022 discloses a holder included as part of a fish lure, the holder made from a thin flexible strip of plastic folded intermediate its length to provide parallel sides which engage the bait. The bait is secured between the sides of the holder by a spike. The holder is attached to a leader which connects the hook to the fishing line.

U.S. Pat. No. 2,895,254 discloses a combined fish lure and bait holder having a base plate to which a generally triangular member is rigidly mounted for holding the bait.

U.S. Pat. No. 2,939,241 discloses a bait holder and protector including a bait holding member of thin sheet plastic.

SUMMARY OF THE INVENTION

It is a primary object of this invention to provide a combined fish lure and, bait holder to which an artificial or live bait may be easily secured or released.

It is another object to provide a combined fish lure and bait holder which causes the bait to simulate the action of a live fish.

It is a further object of this invention to provide an artificial bait for use with the bait holder and lure described herein or for independent use with other lures.

It is still a further object of this invention to provide a combined lure/bait holder/artificial bait assembly.

These and other objects are accomplished by a combined fish sure and bait holder comprising (1) a bait holder formed of a strip of resilient spring-like material folded intermediate its length to provide two laterally spaced side legs adapted to clamp and hold the bait inserted therebetween, (2) a flat plate of greater width than length having two slots therein at one end, each slot receiving one of the laterally spaced side legs of the bait holder therethrough so that as the plate is moved along the length of the side legs from the fold thereof toward the free ends thereof, the side legs are moved toward each other to clamp and hold the bait. The plate has an opening, preferably along its mid-line, receiving a length of fishline leader therethrough. The fishline leader extending through the opening of the plate has a fastening end for attaching to a fishline and a hook end provided with hook means. The configuration of the plate is such that, as it is pulled through the water it causes the bait holder and bait held thereby to zigzag and have a rolling action simulating the action of a live bait.

BRIEF DESCRIPTION OF THE DRAWINGS

FIG. 1 is a side elevation view of the combined fish lure, bait holder and artificial bait;

FIG. 2 is a top view of the combined fish lure, bait holder and artificial bait of FIG. 1;

FIG. 3 is a top plan view of the combined fish lure, bait holder and artificial bait showing the rolling action of the assembly as it is pulled through the water;

FIG. 4 is a top view of the combined fish lure and bait holder showing the bait holder in release position;

FIG. 5 is a side view of the artificial bait; and

FIG. 6 is a top view of the artificial bait of FIG. 5.

DETAILED DESCRIPTION OF THE PREFERRED EMBODIMENT

Referring to FIG. 1, the bait holder 10 is formed of a strip of resilient spring-like material folded intermediate its length to provide two laterally spaced side legs 11 and 12. Side leg 12 is bent near its free end at substantially a right angle to form a gripping edge 12a which is provided with a serrated edge 12b for gripping and clamping the bait between the serrated edge 12b and the free end of side leg 12. The bait holder is preferably formed of a piece of spring brass, although other metals or synthetic plastics having the proper resiliency characteristics may be used. When the bait is clamped between edge 12a and leg 12 as illustrated in FIGS. 1 and 2, the side legs 11 and 12 are generally parallel to each other. The upper edges of the side legs 11 and 12 are provided with a series of notches 13 whose function will be described later.

A flat planar plate 14 of brass or other metal or synthetic plastics, is secured to the bait holder as will be described. The plate 14 functions to impart an action to the bait and bait holder as will be described. The plate 14 is of greater length than width and is provided at its upper end with two parallel slots 15 and 16 adapted to receive, respectively, side legs 11 and 12 therethrough. The plate 14 is freely movable along the length of each of the side legs 11 and 12. As the plate is moved forward toward the fold 17 in the bait holder 10, the spring action of the legs 11 and 12 of the bait holder forces the side legs 11 and 12 apart to release the bait as illustrated in FIG. 4. As the plate 14 is moved toward the free ends of side legs 11 and 12 the spacing of the slots in plate 14 forces the side legs 11 and 12 together to a clamping position for clamping the bait as illustrated in FIG. 2.

The angle of the plate 14 relative to the bait holder 10 is adjusted by placing the upper edge of each of the slots 15 and 16 in the notches 13 in the bait holder as illustrated in FIG. 1. With the plate positioned in the notch illustrated in FIG. 1, i.e. the notch which is the greatest distance from the fold 17 of the bait holder, the plate, as it is pulled through the water, imparts a counterclockwise rolling action to the bait holder and the bait held thereby as illustrated in FIG. 3. The diameter of the roll is greatest when the plate is in the position illustrated in FIG. 1. As the plate is moved to the more forward notches 13 the diameter of the rolls decreases. The fisherman can choose the action he desires by adjustment of the angle of the plate 14 relative to the bait holder 10.

The width of the upper edge 18 of the plate is less than the width at its lower end. The lower edge has two angled cutoff portions 19 and 20 cut at different angles with respect to each other and with respect to the side edges 21 of the plate. Along the mid-line of the plate and beneath the slots 15 and 16 is an opening 22 through which a fish line extends.

Referring to FIG. 1, the fishline leader 23 has a small diameter plastic ball 24 secured thereto intermediate its ends which butts against the rear side of plate 14 as the leader is pulled forward relative to the bait holder. The fastening end of the fishline is provided with conventional swivels and an eyelet for attaching to the fishline. The hook end 25 of the leader line is provided with suitable hook means 26.

An artificial or other bait is secured to the fish lure and bait holder by pulling the plate 14 forward as illustrated in FIG. 4 to open the side legs of the bait holder. One end of the bait is inserted between the side legs 11 and 12 and the plate 14 moved back a distance sufficient to clamp the bait between the side legs 11 and 12 as illustrated in FIG. 2. The plate is then positioned at an angle relative to the bait holder as desired by positioning the upper edge of the slots of the plate in one of the notches 13 as illustrated in FIG. 2. When the fish lure and bait holder is pulled through the water it moves in a back and forth motion as well as rolls counterclockwise as illustrated in FIG. 3.

A further aspect of this invention is an artificial bait for use with the combined fish lure and bait holder described or with other fish lures and bait holders. The artificial bait comprises an elongated, planar strip of thin synthetic foam 27 such as polyurethane or polyethylene foam about ⅛ inch thick in the shape of a fish. The respective planar sides of the piece of foam are coated with an iridescent, pearlescent material 28 resembling fish scales. Such material is commercially available. Generally the material can be purchased with an adhesive backing. When the backing paper is removed, the strip of material can be adhered directly to the planar sides of the foam material as illustrated in FIGS. 5 and 6. At predetermined intervals along the length of the bait, the foam is interrupted and the material on both sides adhered together at 31 or the material severed without interruption of the foam so that the bait can bend and flex easily as illustrated in FIG. 2. As the fish lure/bait holder/artificial bait is pulled through the water, as illustrated in FIG. 2, the artificial bait bends as illustrated to resemble the action of live bait. A cut-out portion 29 may be provided for securing the artificial bait to the bait holder.

The combined fish lure and bait holder provides an attractive, easily usable lure for fish of various kinds. It is predominantly useful along the West Coast of the United States and Canada for salmon fishing. The artificial bait illustrated resembles a herring strip which is conventionally used as bait for salmon.

I claim:

1. A combined fish lure and bait holder comprising:
    a bait holder formed of a strip of resilient spring-like material folded intermediate its length to provide two laterally spaced legs adapted to clamp and hold a bait inserted therebetween,
    a flat plate of greater length than width having two slots therein at one end, each slot receiving one of the laterally spaced legs of the bait holder therethrough, the slots spaced a distance apart so that as the plate is moved along the length of the laterally spaced legs from the fold thereof toward their respective free ends, the spacing of the slots causes the side legs of the bait holder to move toward one another to clamp and hold the bait therebetween,
    an opening along the lengthwise mid-line of the plate receiving a length of fishline leader therethrough, and
    a fishline leader extending through the opening of the plate having a fastening end for attaching to a fishline and a hook end provided with hook means, the configuration of the plate causing the lure, bait holder and bait held thereby to zigzag back and forth as well as rotate as they are pulled through the water.

2. The combined fish lure and bait holder of claim 1 including notches along the upper edges of each of the side legs of the bait holder for engaging the upper end of each of the slots of the plate to retain the plate in a fixed position relative to the side legs of the bait holder.

3. The combined fish lure and bait holder of claim 1 wherein the plate has a greater width at its lower end relative to its upper end and wherein the slots are located near the upper end thereof.

4. The combined fish lure and bait holder of claim 1 including stop means on the fishline preventing the fishline from being pulled out of the opening in the plate.

5. The combined fish lure and bait holder of claim 1 wherein one of the free ends of one of the side legs clamping the bait is bent at a right angle relative to that side leg and provided with a serrated edge for gripping the bait.

6. The combined fish lure and bait holder of claim 1 including a flexible, inexpensive artificial bait clamped by the side legs of the bait holder, the artificial bait including an elongated, thin strip of synthetic foam material having a coating of an iridescent, pearlescent material thereon resembling fish scales.

7. The combined fish lure and bait holder of claim 3 wherein the plate includes cutoff portions on its lower edge which cause the plate, bait holder and bait attached thereto to zigzag back and forth and roll as it is pulled through the water.

* * * * *